United States Patent [19]

Claassen et al.

[11] 4,331,464
[45] May 25, 1982

[54] GLASS SHEET SUPPORT OF RING-LIKE CONFIGURATION

[75] Inventors: George R. Claassen, New Kensington; John J. Ewing, Tarentum, both of Pa.

[73] Assignee: PPG Industries, Inc., Pittsburgh, Pa.

[21] Appl. No.: 239,780

[22] Filed: Mar. 2, 1981

[51] Int. Cl.³ ............................................. C03B 23/02
[52] U.S. Cl. ...................................... 65/273; 65/286; 65/348; 414/104
[58] Field of Search ................ 65/273, 286, 289, 348, 65/349, 350, 351; 414/104, 331

[56] References Cited

U.S. PATENT DOCUMENTS

| | | | |
|---|---|---|---|
| 3,418,098 | 12/1968 | Kirkman | 65/273 |
| 3,563,721 | 2/1971 | Ritter, Jr. | 65/273 |
| 4,092,141 | 5/1978 | Frank et al. | 65/114 |
| 4,185,986 | 1/1980 | Frank | 65/287 |

*Primary Examiner*—Arthur D. Kellogg
*Attorney, Agent, or Firm*—Edward I. Mates

[57] ABSTRACT

A ring-like member for transporting a glass sheet through a cooling station comprising an open-ended outline rail having a transverse space between its ends and a rail member supported between the ends of said outline rail, to occupy a portion of said space. Preferably, a cantilever support that is located entirely within said outline rail and has no structural elements aligned longitudinally of the relatively short spaces between the ends of said outline rail and the ends of said rail member, supports said rail member in a position it would occupy if it were part of said outline rail if its open end were closed.

6 Claims, 8 Drawing Figures

GLASS SHEET SUPPORT OF RING-LIKE CONFIGURATION

BACKGROUND OF THE INVENTION

1. Field of the Invention

The present invention relates to apparatus for handling glass sheets during shaping and cooling, and in particular, to a ring-like member or shuttle having an outline supporting surface that conforms in elevation to the elevational shape of a bent glass sheet supported thereon and in outline to a shape slightly inside the periphery of a bent glass sheet supported thereon. The purpose of the ring-like member is to support the glass sheet while conveying the latter in a downstream direction from a first station, usually a glass sheet shaping station, to a second station which is usually a transfer station. The transfer station is at the downstream end portion of a cooling area. After the glass sheets are shaped at the first station, the ring-like member transfers the glass sheet into a cooling area to the second station. At the second or transfer station, a plurality of rolls rise in unison to support the shaped and cooled glass sheet above the ring-like member and rotate to convey the latter from the ring-like member to a downstream conveyor which removes the glass sheet from the transfer station for further processing. The ring-like member is shuttled back to the first station to receive another glass sheet.

Initially, when a ring-like member was shuttled to transfer a glass sheet from a shaping station through a cooling area to a transfer station, a continuous closed ring was used. The closed ring had to remain in position at the transfer station until the entire length of the glass sheet after its transfer from the ring-like member to the rolls was removed to a position entirely downstream of the second position and the rolls of the vertically movable transfer conveyor section lowered to provide clearance for the closed ring-like member to be shuttled back to the first station to receive the next glass sheet undergoing processing.

In an effort to accelerate the rate of glass sheet production, the downstream end portion of the ring-like member was modified to provide a pair of downstream end portions that extend transversely toward one another in opposite transverse directions to provide a transversely extending space between the lateral inner ends of the downstream end portions. This space was of a width sufficient to provide clearance for the arrays of rolls mounted on common shafts so that the rolls could remain in an elevated position to move the lifted glass sheets downstream of the second or transfer station while the ring-like member shuttled upstream to be in position to receive the next glass sheet. Unfortunately, since it was necessary to have several rolls mounted on several shafts spaced longitudinally of the conveyor path traversed by the shuttling ring-like member, and it was also necessary for each of the shafts to support a plurality of transversely spaced rolls to insure that the glass sheet was lifted from the ring-like member in non-tilting relation by having rolls disposed on opposite sides of the center of gravity of the lifted glass sheet, the clearance space occupied a considerable portion of the transverse dimension of the downstream end portion of the member. Consequently, the portion of a glass sheet unsupported over the transverse clearance space sagged uncontrollably because of lack of local support during its transfer from the first station to the second station.

Prior to the present invention, the only solution that appeared to be available to resolve the problem of uncontrolled sag in the leading edge portion of glass sheets transferred on ring-like members having a transversely extending space between the inner ends of the transversely extending downstream end portions was to return to the continuous ring construction of the downstream end portions of the earlier ring-like members that formed a continuous enclosed ring. The return to the original continuous ring construction for the shuttle member has reduced the leading edge sag in the glass sheets, but at the expense of a slowdown to the earlier rate of production because of the need for the transfer ring to await clearance of the glass sheet and lowering of the transfer rolls prior to it being free to return to the first station.

It would be beneficial to the glass sheet shaping art if the ring-like transfer member used as a shuttle to transfer glass sheets from a first station where the glass is shaped to a second station where the glass sheet is transferred from a cooling area to a downstream conveyor were able to return to the first station more rapidly than is possible with continuous ring-like shuttle members to receive a subsequent glass sheet without losing control over the shape of the glass at its leading edge portion.

2. Description of Patents of Interest

U.S. Pat. No. 4,092,141 to Robert G. Frank and DeWitt W. Lampman provides a method and apparatus for conveying glass sheets through a furnace on conveyor means, heating the glass sheets while passing through a furnace to a temperature approaching the glass softening point. At a shaping station beyond the furnace, each glass sheet in turn is lifted into engagement with an upper vacuum mold having a shape conforming to that desired for the glass sheet. The upper vacuum mold remains at the shaping station and holds the shaped glass sheet thereagainst as the lifting means retracts to below the level of the conveyor means. A continuous ring member shaped to support the bent glass sheet adjacent its marginal or peripheral edge only, moves generally horizontally as a shuttle between the shaping station and through a cooling area to a transfer station to receive each shaped glass sheet released by vacuum to deposit the sheet onto the tempering ring at the shaping station and transfer it through the cooling area to the transfer station.

After the sheet is shaped and cooled, a vertically movable sheet transfer means rapidly lifts each bent glass sheet to remove the latter from the continuous ring member after the glass sheet has had its surfaces hardened sufficiently to permit it to be conveyed on an additional downstream conveyor providing spaced rotating rolls along a glass sheet supporting surface at an elevation slightly higher than the level at which the glass sheet is supported by the continuous ring member. However, since the transfer and continuous ring member is endless, the apparatus of this patent delays the return movement of the continuous ring member to the first or shaping station until after the trailing edge of the shaped, surface hardened glass sheet has moved downstream into a position in which the entire glass sheet is completely beyond the transfer and tempering ring, and the transfer means is lowered to a position providing clearance for returning the shuttling continuous ring member to the first station.

The sheet transfer means for removing the glass from the tempering ring to the additional downstream conveyor according to the Frank and Lampman patent comprises a frame support and lifting and lowering mechanism for raising and lowering the frame support and a plurality of rotating conveyor rolls having doughnut shaped support members carried by narrow shafts mounted on the frame support. The apparatus is so constructed that the conveyor rolls of the sheet transfer means are arranged in a matrix on parallel shafts that move vertically in unison between a lower, recessed position where the rotating conveyor rolls are clearly below the movement of the continuous ring member and its supporting carriage and a raised position wherein the rotating conveyor rolls have a common upper tangential surface and provide rotating elements of a glass sheet supporting surface disposed above the level of support provided by the upper edge surface of the continuous ring member and at a level of support provided by a tangential surface common to the rolls of the additional downstream conveyor.

U.S. Pat. No. 4,185,986 to Robert G. Frank provides a feature that enables a ring-like member, which is substituted for the continuous ring member of the previous patent to start its return to the shaping station sooner than permitted by the prior art and, more specifically, before the vertically movable rotating conveyor rolls of the glass sheet transfer means have moved the tempered glass sheet beyond the extreme downstream position that the ring-like member occupies during the production cycle and before the rotating rolls of the sheet transfer means are lowered to their recessed position. The ring-like member of the latter patent comprises a pair of downstream end portions which extend transversely toward one another and are laterally spaced from one another to provide a single, transversely extending space therebetween. The transversely extending space provided in this patent is slightly wider than the space between the outer surfaces of the transfer rolls mounted on common shafts to permit the vertically moveable transfer means to be entirely clear to move between the lateral inner ends of the spaced transversely extending downstream end portions of the ring-like member even when the transfer means is in its raised position. Unfortunately, in dealing with glass sheets of ⅛ inch thickness (3.2 mm.) and less, the time needed to transfer a hot glass sheet from the shaping station to the transfer station was such that the unsupported leading edge portion of the glass sheet in the downstream end portion of the glass developed sag beyond tolerance limits.

The first solution to this problem was to reduce the rate of production by reinstituting the continuous ring member disclosed in the earlier Frank and Lampman patent for the ring-like member having the discontinuous downstream end portion of the later Frank patent. It would be more desirable to maintain the production rate developed by the Frank patent without continuing to have the leading edge portion of the glass sheet sag beyond limits acceptable to the customer.

SUMMARY OF THE INVENTION

The present invention introduces a rail member to occupy a major portion of the space between the inner ends of the laterally extending downstream end portions of the rail-like member. The ends of the rail member are spaced from the ends of the downstream end portions of the ring-like member a smaller distance than the original space to provide a plurality of narrow clearances for the thickness of each of the transfer rolls mounted on the common shafts. The upper edge surface of the rail member occupies the same position it would occupy if it were a portion of a continuous ring member instead of an insert within the transverse space of a discontinuous downstream portion of a ring-like member. Therefore, it provides auxiliary support for a major portion of the leading edge portion of the glass sheet that was formerly unsupported. In a specific embodiment of this invention, a cantilever support means is provided to support the novel rail member of the present invention. The cantilever support means has no structural elements above or below the ring-like member and no structural elements aligned longitudinally of the smaller spaces between the ends of the added rail member and the inturned ends of the ring-like member.

The rail member is oriented with its width extending vertically and the means to support the rail member relative to the remainder of the structure of the ring-like member comprises bars oriented with their widths extending obliquely. The vertical dimensions are such that their lower edges are located in positions above the raised positions occupied by said shafts such as to provide clearance for the shafts on which the doughnut-like rolls are mounted when the latter occupy their raised, glass sheet removing positions. Furthermore, the glass sheet removal means comprises axially spaced, relatively thin doughnut rolls which are located on opposite transverse sides of the longitudinal line passing through the center of gravity of the glass sheet when removing it from the shuttle or ring-like member, and the vertically movable shafts are located on opposite longitudinal sides of the transverse line passing through the center of gravity of the supported sheet at the second station to provide support for lifting the shaped and cooled glass sheet off the ring-like member at the second station. Such construction of the glass sheet removal means insures that the glass sheet transfers to the rolls without tilting.

Corresponding doughnut rolls mounted on adjacent shafts of the glass sheet removal means are aligned longitudinally of the openings in the ring-like member between the newly introduced rail member of the present invention and the ends of the transversely extending downstream end portions of the ring-like member. In this manner, the downstream end portion of the glass sheet is provided with virtually continuous support, the discontinuations between support areas being insufficient to allow the short, unsupported glass portions to sag beyond tolerance limits. The resulting short spaces provide clearance for the doughnut-like rolls when the ring-like shuttle member moves upstream, even though the rolls are not yet lowered to below the plane occupied by the ring-like shuttle member. In addition, the vertical dimension of the newly added rail-like member of the present invention and its support structure is so correlated to the dimensions of the doughnut rolls and the lifted shafts on which they are mounted that in the raised position of the sheet transfer means, the upper horizontal tangent common to the doughnut rolls is located higher than the upper edge of the rail-like member while the shafts on which the doughnut rolls are mounted are located below the lower edge of the rail-like member to permit clearance for the ring-like member to start moving upstream relative to the roll supporting shafts while the glass sheet is unloaded from the ring-like member. It is only necessary to lower the shafts in time for the arrival of the ring-like member into the transfer section during the next cycle.

The benefits of the present invention will be understood better in light of a description of a specific embodiment of this invention which follows.

BRIEF DESCRIPTION OF THE DRAWINGS

In the drawings which form part of a description of an illustrative embodiment.

DESCRIPTION OF THE PREFERRED EMBODIMENT

Figure 1:
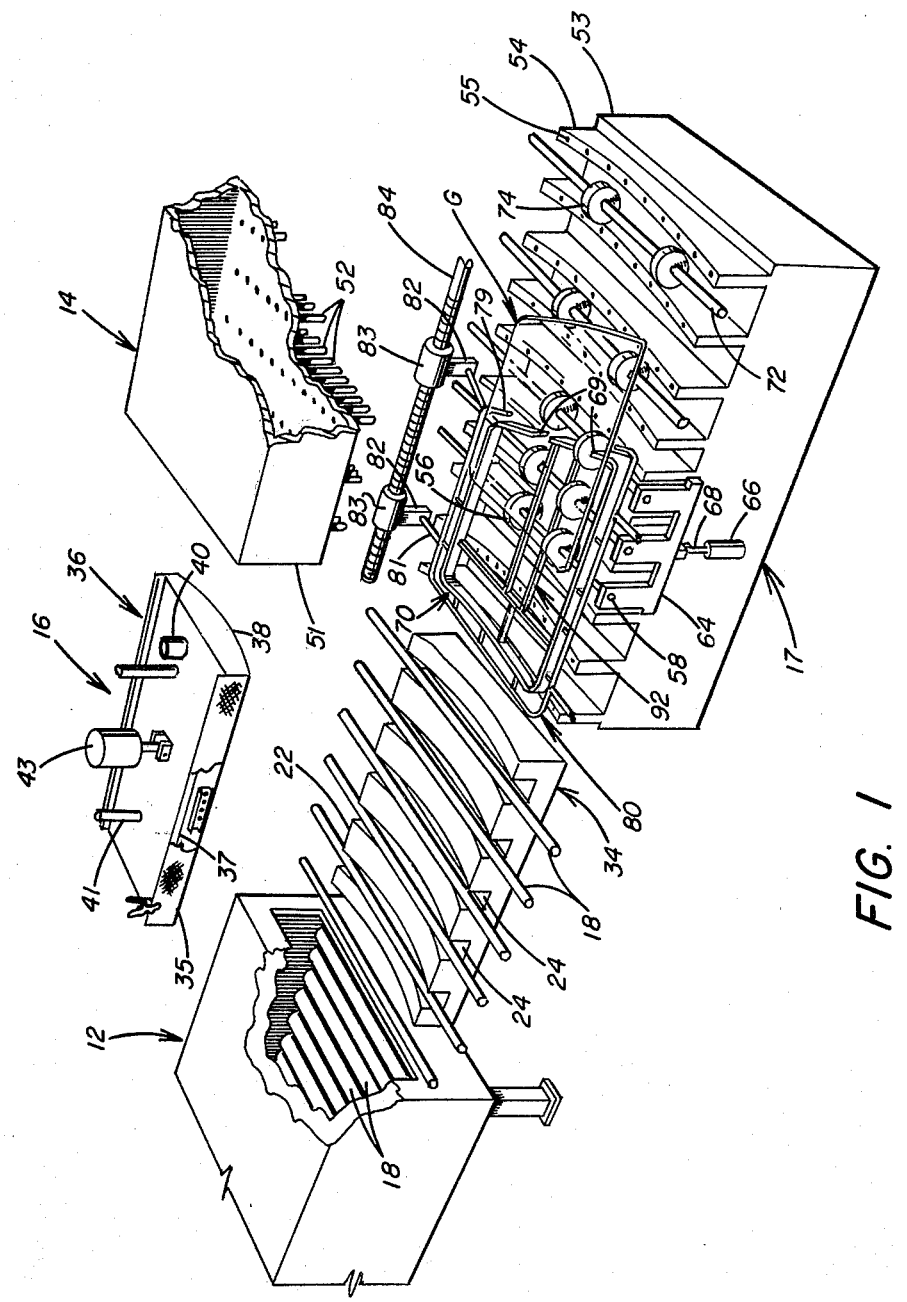
FIG. 1 is a fragmentary, perspective, partly schematic view looking upstream of apparatus conforming to the present invention taken from one side of sheet transfer means showing a ring-like member of the present invention returning upstream to a shaping station while a glass sheet moves downstream into a downstream conveyor, with certain parts omitted to show other parts more clearly.
Figure 2:
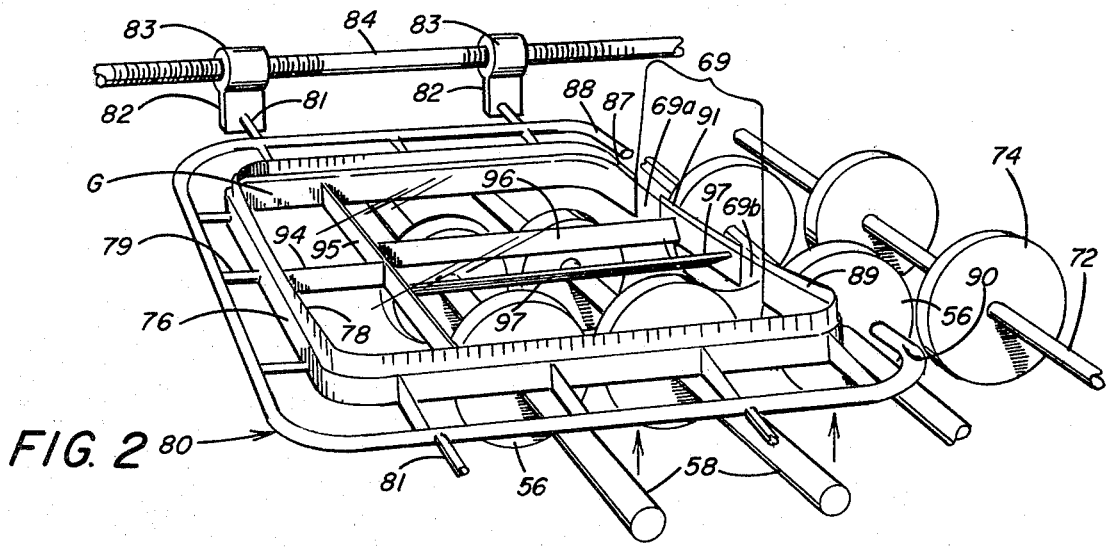
FIG. 2 is a fragmentary, perspective view of the modified ring-like member taken in an oblique downstream view at the moment a glass sheet arrives at a transfer station.
Figure 3:
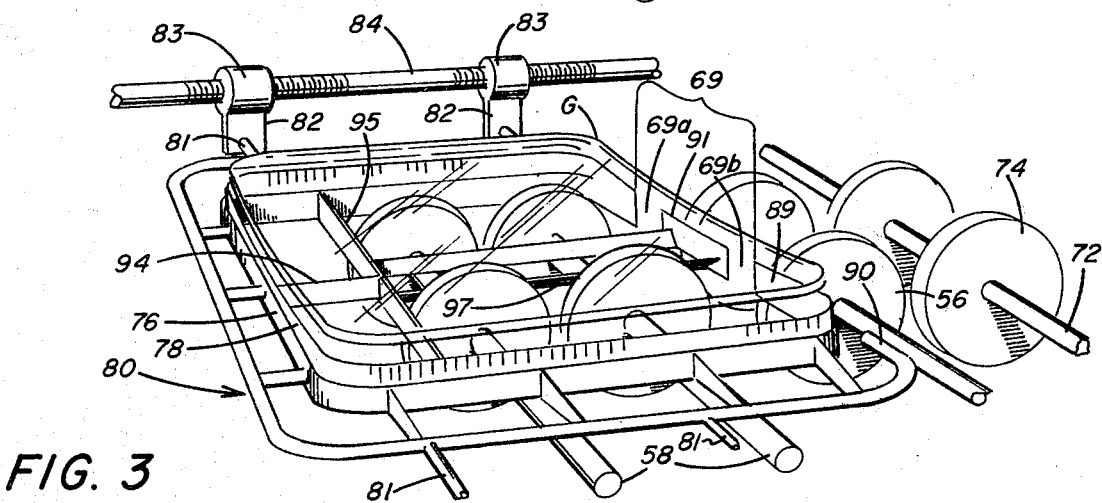
FIG. 3 is a view similar to FIG. 2, taken at the moment the glass sheet is lifted from the ring-like member.
Figure 4:
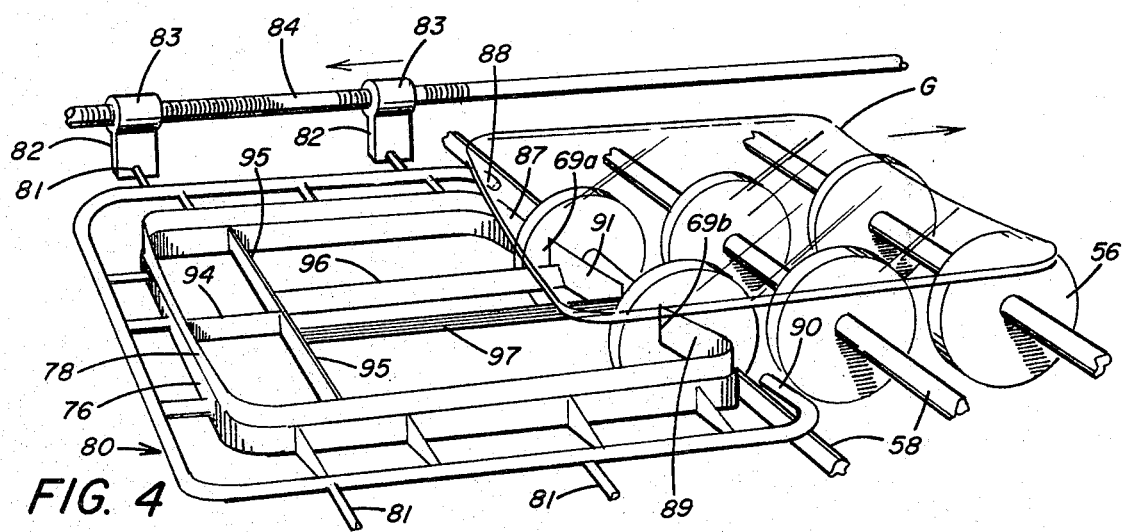
FIG. 4 is a view similar to FIGS. 2 and 3, taken when the glass sheet moves downstream on lifted rolls while the ring-like member moves upstream simultaneously.
Figure 5:
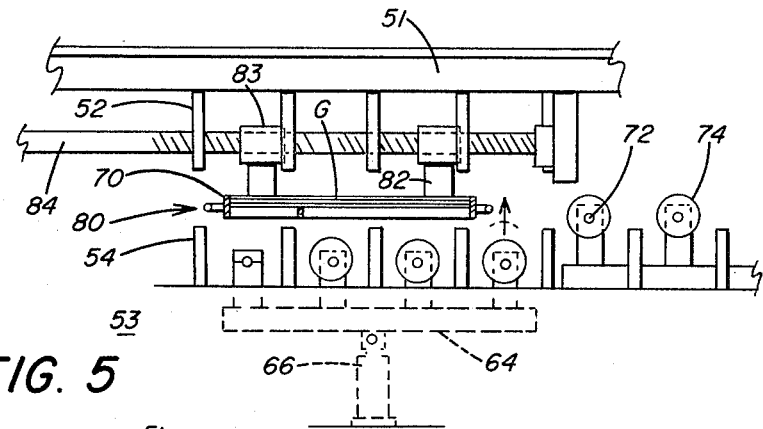
FIG. 5 is a view taken in longitudinal elevation at the time depicted in FIG. 2.
Figure 6:
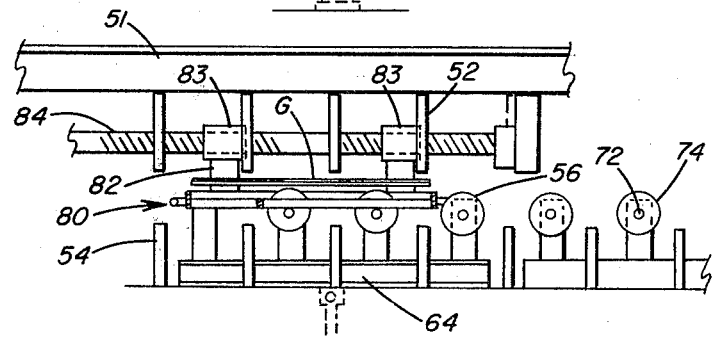
FIG. 6 is a longitudinal elevational view taken at the time depicted in FIG. 3.
Figure 7:
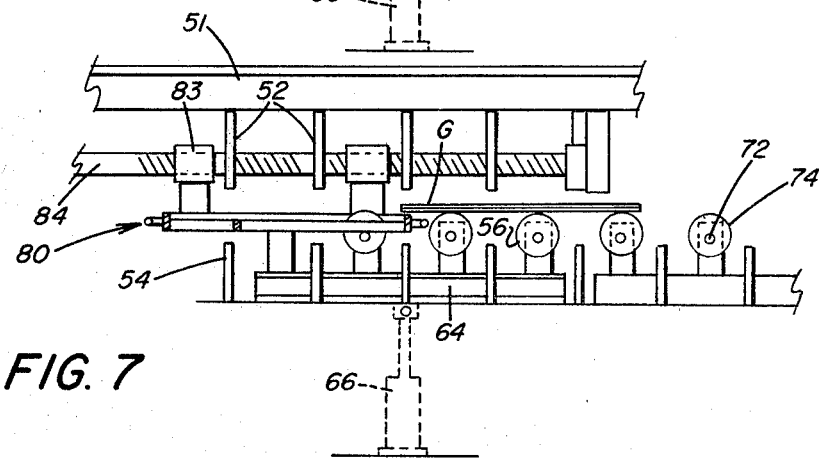
FIG. 7 is a longitudinal elevational view taken later than the time of FIG. 6.
Figure 8:
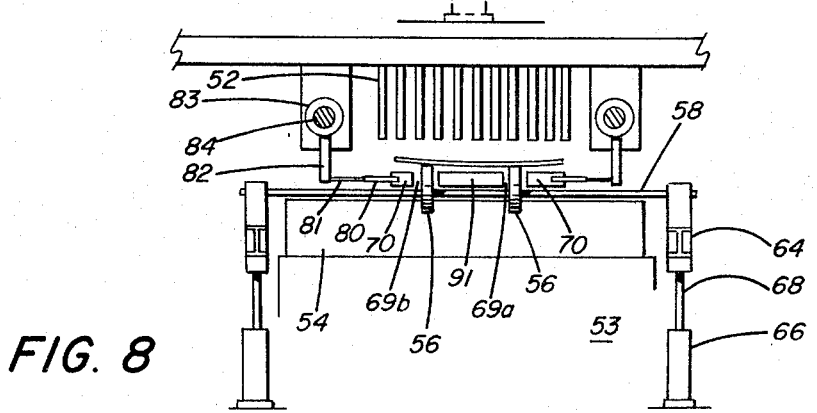
FIG. 8 is an end elevation showing how the present invention provides clearance for moving the modified ring-like member upstream while the glass sheet moves downstream before the glass sheet clears the ring-like member and the transfer rolls are lowered.

Referring now to the drawings, an apparatus for treating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 17 located in the cooling station 14 transfers the shaped and tempered glass sheet to a downstream conveyor for transport to the unloading station.

Heat may be supplied in the furnace 12 by hot gases from gas burners or by electrical radiant heaters or by a combination of both, which heat supply means are well known in the art. The heating means includes a horizontal conveyor comprising longitudinally spaced, transversely extending conveyor rolls 18 that define a path of travel which extends through the furnace 12 and the shaping station 16. The rolls of the conveyor are arranged in sections and their rotational speed controlled through clutches (not shown) so that the speed of the different conveyor sections may be controlled and synchronized in a manner well known in the art. A glass sensing element (not shown) is located beyond the exit of furnace 12 to initiate a cycle of operation of this apparatus.

Various limit switches are provided to synchronize the operation of various elements of the apparatus according to a predetermined sequence. The glass sensing element, the limit switches and various timer circuits actuated thereby cooperate to provide synchronizing means for the apparatus of the present specification in a manner described more thoroughly in U.S. Pat. No. 4,187,095 to Robert G. Frank.

The shaping station 16 comprises a lower shaping mold 34 and an upper vacuum shaping mold 36. The latter is composed of metal covered with a refractory material such as fiber glass 35 as is well known in the art. The former comprises an upper surface comprising spaced elongated shaping members 22 conforming in elevational shape to the shape desired for a glass sheet to be bent. The upper surface formed by the shaping members 22 is interrupted by intermittent transversely extending grooves 24 which provide clearance for raising and lowering the lower shaping mold 34 between a recessed position below the conveyor rolls 18, as depicted in FIG. 1, and an upper position above the level of said conveyor rolls (not shown). The lower shaping mold 34 is fixed to a lower mold support (not shown) and readily detachable therefrom to substitute a mold 34 for a different production pattern.

The upper surface 22 of the lower shaping mold 34 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. A good material for the grooved lower shaping mold 34 is an alumino-silica cement sold by Johns-Manville under the trademark of TRANSITE.

Raising and lowering means in the form of a piston rigidly mounted to the lower mold support raises and lowers the support and its attached lower shaping mold 34.

The upper vacuum mold 36 has an upper mounting plate 37 and a lower wall 38 that is apertured, as well as side walls. The lower wall 38 is shaped to be complemental to the shaping surface formed by the upper surface 22 of the lower shaping mold 34. The upper vacuum mold 36 communicates with a source of vacuum (not shown) through an evacuation pipe 40 and a suitable valve (not shown). The upper vacuum mold 36 is suitably connected through upper vertical rods 41 to an upper supporting frame (not shown) and is movable relative thereto by an upper vertical piston 43. The upper vacuum mold 36 is readily detached from its upper mounting plate 37 to permit rapid substitution of another upper vacuum mold 36 conforming to a different production pattern. The evacuation pipe 40 may be connected through a suitable valve arrangement to a source of pressurized air (not shown) and the valves for the vacuum line and for the pressure line may be synchronized according to a predetermined time cycle in a manner well known in the art.

The apertures in the apertured lower wall 38 are made as small as possible and are spaced as closely as is necessary to assure vacuum support for a hot glass sheet with reasonable energy consumption. For an upper vacuum mold having a glass sheet engaging apertured lower wall 38 with dimensions 46 inches (177 centimeters) long and 22 inches (56 centimeters) wide, apertures having a diameter of 0.09 inches (0.23 centimeters) and spaced apart from one another 1.5 inches (3.8 centimeters) in a rectangular or diamond pattern have been found to work adequately in handling glass sheets whose weight is up to 20 pounds (9 kilograms).

The cooling station 14 comprises an upper plenum 51 provided with longitudinally spaced transverse rows of transversely spaced pipe nozzles 52 extending downward to direct air applied under pressure to the upper plenum toward the upper surface of a glass sheet that is aligned with the bottom openings of the nozzles. Opposing the upper plenum 51 is a lower plenum 53 provided with lower bar-type nozzle housings 54 disposed with thick walls extending vertically and having elongated openings 55 directed upward through their thickness so that air applied under pressure to the lower plenum 53 is directed upward through the elongated openings 55 against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving a ring-like member 70 along a path between said upper nozzles and said lower nozzles. The lower ends of the rows of pipes are located along a curved surface complementary to the curved shape of the upper smooth surfaces of the bar-type housing for the lower nozzles to provide a curved clearance space therebetween conforming to the transverse shape of the glass sheets conveyed therebetween. If desired, the plenums 51 and 53 may be sectionalized along the length of cooling station 14 to provide different air pressures into the various sections of the upper plenum and of the lower plenum so as to provide a program of air blasts along the length of the cooling station 14.

The upper surfaces of the lower bar-type nozzle housings 54 are smoothly surfaced and parallel to one another to provide discontinuous smooth surfaces on which glass cullet is deposited when a glass sheet fractures in the cooling station 14. The lower bar-type nozzle housings 54 may be interconnected by a pivotally mounted frame (not shown) that pivots about an axis extending longitudinally of the length of the cooling station 14, as depicted in U.S. Pat. No. 3,846,106 to Samuel L. Seymour. Frame pivoting means is provided to pivot the frame, thereby pivoting the smoothly surfaced lower bar-type nozzle housing 54 into an oblique orientation that permits the glass fragments to slide to one side of the cooling station and before the next glass sheet is processed. The means to pivot the lower bar-type nozzle housings 54 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets.

The sheet transfer means 17 at the cooling station 14 includes a vertically movable conveyor section comprising a set of doughnut rolls 56 of relatively large diameter mounted on the central portions of thin shafts 58 driven from a gear box and a motor (not shown) mounted on the upstream end portion of a frame 64. Elevator means 66 in the form of one or more pistons is rigidly supported (each with a piston rod 68) to provide vertical movement for said frame. When piston rods 68 are extended, the set of doughnut rolls 56 is lifted in unison in a vertical direction into positions where their common upper tangential plane lies in a horizontal plane above the uppermost portion of the shaping surface of the ring-like member 70 to transfer a glass sheet therefrom.

The cooling station 14 also comprises a downstream conveyor comprising additional conveyor shafts 72 downstream of the sheet transfer means 17. Each additional conveyor shaft 72 is provided with a pair of additional doughnut rolls 74 fixed thereto for rotation therewith. The shafts 72 are longitudinally spaced from one another along the length of the downstream conveyor and the additional doughnut rolls 74 are rigidly supported with their common upper tangent occupying a horizontal plane slightly above the uppermost surface of ring-like member 70.

A preferred embodiment of the ring-like member 70 is shown in U.S. Pat. No. 3,973,943 to Samuel L. Seymour and comprises a metal rail 76 that extends in the form of a ring-like structure disposed edgewise with its width forming the height of the rail attached for reinforcement to a series of non-metallic bars or bar portions 78 formed from cutting a board of non-metallic material such as an electric insulator material that is sold as SYNTHANE G-7 electric board by the Synthane Taylor Co. of Valley Forge, Pa. Connectors 79 are attached at their inner ends to the laterally outer surface of metal rail 76 at spaced points therealong and at their outer ends to a reinforcing frame 80. Both the latter and the frame-like member 70 are open-ended at their downstream ends.

The insulator material for the non-metallic bar or bar portions is composed of a series of fiber glass layers bonded together with an epoxy resin believed to be a highly cured methyl phenyl silicone. The bar portions 78 have a low heat conductivity and are of a low expansion material and are approximately 3 millimeters thick. Each of the nonmetallic bar portions has a desired shape conforming to the shape of a different portion of the metal rail 76 except that the vertical heights of bars 78 are higher than the height of the metal rail 76. Each bar 78 is secured to the inner surface of the rigid metal rail 76 by nut and bolt means spaced throughout the peripheral length of the reinforcing metal rail 76 and extending through aligned bolt-receiving openings in the rigid metal rail 76 and the bar portions 78. The bottom edges of the bar portions 78 are aligned with the bottom edge of the rigid metal rail 76, although this is not absolutely necessary except that in such an arrangement the full height of the metal rail is provided in side-by-side relation to the bar portions 78 to reinforce the structural rigidity of the bar portions of non-metallic material with minimum heat capacity for the composite ring-like member 70.

The upper edge of each bar portion 78 of non-metallic material is disposed above the upper edge surface of the reinforcing rigid metal rail 76 and provides an upper edge surface of said ring-like member 70 so that when glass is deposited on the ring-like member, it makes contact only with the non-metallic glass engaging means provided by the bar portions 78 that are reinforced by the rigid metal rail on spaced relation below the line of glass sheet contact. The elevation of the glass supporting surface of the bar portions above the upper edge of the rigid reinforcing metal rail is preferably sufficient to provide a path of heat conduction through said non-metallic bar portions of sufficient length to have minor detrimental effects only in the cooling of the glass contacting portion, yet not so long as to endanger the structural strength of the non-metallic bar portions 78.

The ring-like member 70 is continuous except for a pair of downstream end portions 87 and 89 extending transversely inwardly toward one another to provide a transversely extending space 69 between the inner ends thereof. The space occupies a substantial portion of the width of said ring-like member.

The reinforcing frame 80 is preferably constructed of an outer steel pipe similar in outline shape to that of the ring-like member 70 and surrounding the latter in spaced relation thereto. The space between the ring-like member 70 and the reinforcing frame 80 is determined by the length of the connector means 79. The frame 80 forms the framework of a shuttle that is connected through connecting rods 81 to brackets 82 having internally threaded ears 83 that receive a rotatable worm drive 84. The reinforcing frame 80 is open-ended and includes a pair of downstream frame end portions 88 and 90 having inner ends laterally spaced from one another so that the spaces provided between the inner ends of downstream end portions 87 and 89 and between the inner ends of downstream frame end portions 88 and 90 are in longitudinal alignment with one another.

The doughnut rolls 56 of the shaped glass sheet transfer means 17 are arranged in spaced, parallel rows. At their upper positions, the vertically movable rolls 56 have an upper common tangent in the same horizontal plane as the upper common tangent of the additional doughnut rolls 74. At their lower positions, rolls 56 are located below the path taken by glass sheets supported on the ring-like member 70.

The worm drive 84 controls the position of the ring-like member 70 relative to one of the three positions of rest occupied by the ring-like member 70 during a cycle of operation. These positions include a first position at the shaping station 16 where the ring-like member 70 is located above the conveyor rolls 18 and below the upper vacuum mold 36 to receive a hot glass sheet upon release of the vacuum in vacuum mold 36, a second position above the sheet transfer means 17, and a third or intermediate position just downstream of the shaping station 16 whenever the ring-like member 70 arrives too early to move between the conveyor rolls 18 and the upper vacuum mold 36 because the lower shaping mold 34 has not as yet returned to a lowered position below the conveyor rolls 18.

The transfer mechanism at transfer station 17 comprises at least a pair of longitudinally spaced, transversely extending, thin shafts 58, on each of which are mounted at least a pair of doughnut rolls 56. Doughnut rolls 56 are shown mounted on shafts 58 in such a manner as to form an array of transfer rolls located within an area whose width is slightly less than the width of the transversely extending space 69 between the transverse inner ends of the downstream end portions 87 and 89 of the ring-like member 70.

In bending and tempering thin glass sheets wherein they are supported for conveyance from the shaping station to the transfer station on ring-like members 70 having an extended space 69, the leading edge portion of the glass sheets sagged too much to comply with customer requirements. Closed ring members required a slower rate of production because of a lack of clearance until the doughnut rolls were lowered.

According to the present invention, instead of having a relatively wide space 69 between the inner end portions 87 and 89, the majority of this space is occupied by a rail member 91 to form two narrow clearance spaces 69*a* and 69*b*. The rail member 91 comprises an inner metal rail similar in structure to the metal rail 76 of the ring-like member 70 and outer non-metallic bars similar in construction to the outer non-metallic bar members 78 of the ring-like member 70. The rail member 91 is supported to occupy the majority of the space 69 on a support, preferably of the cantilever type 92 (see FIG. 1).

The support comprises an upstream, short longitudinal bar 94 that is attached at its upstream end to the inner major surface of the metal bar component of the upstream end portion of the ring-like member 70. The upstream longitudinal bar 94 extends longitudinally a minor portion of the length of the ring-like member 70 and terminates upstream of a vertical axis passing through the center of gravity of a glass sheet supported on said ring-like member 70. Bar 94 is connected at its downstream end to a cross bar 95. The cross bar 95 extends transversely upstream of said center of gravity between the inner metal components of the longitudinal side portions of the ring-like member 70. One or more longitudinal bars 96 or 97 (two being shown) extend in flanking relation to and parallel to the longitudinal center line of the ring-like member 70 that passes through a vertical axis that intersects the center of gravity of the supported glass sheet. Preferably, the longitudinal bars 96 and 97 are oblique to provide as much strength possible within the vertical dimension of rail member 91 to permit the maximum support possible for said rail member 91 while maintaining minimum interference to clearance. Preferably, when two longitudinal bars are used, they extend longitudinally parallel to the longitudinal center line of the ring-like member, and both are inclined in transversely oblique planes to form mirror images of one another relative to the longitudinal center line of the ring-like member 70 to minimize any distortion.

The inner surface of rail member 91 is attached to the downstream ends of longitudinal bars 96 and 97 by suitable soldering or welding. Narrow portions of the non-metallic inner component of rail member 91 are removed to effect good metal to metal connection between the metal element of rail member 91 and the longitudinal bars 96 and 97. If needed, further structural reinforcement for the cantilever support 92 may be provided by interconnecting longitudinal bars 96 and 97.

The cantilever support 92 is therefore so constructed and arranged that the portion of the ring-like member 70 downstream of the cross bar 95 provides sufficient clearance for the ring-like member 70 to move to a transfer station where certain doughnut rolls 56 are upstream and on opposite transverse sides of the center of gravity of the glass sheet and other doughnut rolls are downstream and on opposite transverse sides of said center of gravity, even when the doughnut rolls are not fully lowered to positions completely below the member 70. When the ring-like member 70 starts to return upstream with the rolls raised to support the transferring glass sheets, the narrow clearance spaces 69*a* and 69b can pass through the positions occupied by doughnut rolls 56 when the latter are elevated.

The dimensions of the rail member 91 are so chosen that its upper edge surface is in line with the upper edge shaping surfaces formed by the ring-like member 70, particularly in a position that would be a connecting portion of downstream end portions 87 and 89 if the latter were interconnected. In a specific embodiment of this invention, doughnut rolls of 4 inches (10 centimeters) in diameter mounted on shafts of half inch (1.27 centimeters) diameter, the vertical movement of the array can approach 1.5 inches (3.8 centimeters). The rail member 91 and the downstream end portions can be more than one inch (2.5 centimeters) high and still permit vertical clearance for shafts 58 in the raised position. Having doughnut rolls of a thickness of ¾ inch (1.9 centimeters), the narrow clearance spaces 69a and 69b are one inch (2.54 centimeters) wide. This is sufficiently wider than the thickness of the doughnut rolls so as to enable the doughnut rolls to pass through the clearances provided by the narrow clearance spaces 69a and 69b. Furthermore, the doughnut rolls 56 mounted on one shaft 58 are longitudinally aligned with the respective doughnut rolls mounted on the other shaft. The doughnut rolls are mounted on their respective shafts on 6 inch (15 centimeters) centers corresponding to the transverse center to center spacing between narrow clearance spaces 69a and 69b. Furthermore, when raised, shafts 58 are below the horizontal elevation of the ring-like member 70 and rail member 91. Therefore, sufficient clearance is provided for moving the transfer doughnut rolls through the openings conforming to the narrow clearance spaces 69a and 69b without having shafts 58 collide with ring-like member 70 or rail member 91 in the raised position.

Further clearance is provided within the outline of the ring-like member 70 and its reinforcing end frame 80 by virtue of the fact that the cross bar 95 is located upstream a sufficient distance relative to the center of gravity of the glass sheet supported on the ring-like member so that when the ring-like member 70 occupies its downstream position where the doughnut rolls transfer the glass sheet onto an unloading conveyor, the center of gravity of the supported glass sheet is along a vertical axis that intersects the area occupied by the doughnut rolls. Furthermore, the individual doughnut rolls are located along their respective shafts in such a manner that when the array of rolls engages the glass sheet, at least one roll is provided on each of the opposite transverse sides relative to the center of gravity of the engaged glass sheet. Thus, when the doughnut rolls rise in unison to lift the glass from the ring-like member 70 and rotate in a clockwise direction to transfer the glass onto an unloading conveyor, the glass sheet does not tilt either longitudinally or transversely.

The doughnut rolls need not remain in their raised positions until the trailing end of the glass sheet has cleared the downstream end portion of the ring-like member. The doughnut rolls may be lowered at any time that the center of gravity of the transferred glass sheet is supported downstream of the area occupied by the doughnut rolls of the transfer conveyor section.

The doughnut rolls may remain in their raised positions until the next cycle when the ring-like member 70 makes its shuttle movement toward the transfer or second station as long as the array of rolls is lowered below the glass engaging position (rather than below the ring-like member) before the shuttling ring-like member arrives at the transfer station on the next cycle. This late lowering still insures that the rolls do not intercept the supported glass sheet during the next cycle as it moves into the transfer station. A shorter vertical distance between the raised and lowered positions reduces the time needed for a complete bending cycle. It is permissible for the rolls to move the supported glass sheet downstream while the ring-like member is moving upstream back to its first station.

The form of the invention shown and described in this disclosure represents an illustrative preferred embodiment thereof. It is understood that various changes may be made without departing from the gist of the invention as defined in the claimed subject matter that follows.

We claim:

1. Apparatus comprising a ring-like member adapted for supporting a hot glass sheet slightly within its peripheral margin during its conveyance along a horizontal path from a first station to a second station downstream of said first station for transfer at said second station to an unloading conveyor comprising a vertically movable roll transfer section comprising an array of at least two doughnut rolls mounted on each of at least two roll support shafts and constructed and arranged over an area of said second station so that at least one of said shafts is located upstream of the center of gravity of said supported glass sheet when said ring-like member is at said second station, at least one transfer section shaft is located downstream of said center of gravity and, at least one transfer section roll on each said shaft is located on each side of said center of gravity of said supported glass sheet, means for lifting said array of rolls in unison to lift and support a glass sheet in non-tilting relation over said ring-like member, said ring-like member having an upper edge surface conforming in elevation and outline to the shape of said glass sheet and extending slightly within the peripheral margin of said glass sheet, said ring-like member having a pair of inturned downstream end portions extending toward one another in opposite transverse directions with transverse inner ends transversely spaced from one another to provide a transversely extending space therebetween slightly wider than the width of said area to provide clearance for said array of transfer section rolls when said ring-like member moves in an upstream direction relative to said lifted array of rolls and shafts toward said first station while said glass sheet moves in a downstream direction on said roll transfer section, the dimension of said transversely extending space and the time needed to transfer said hot glass sheet from said first station to said second station being such that the downstream end portion of said supported glass sheet would sag beyond tolerance during said transfer, characterized by a rail member located within said transversely extending space in closely spaced transverse alignment with the inner ends of said downstream end portions of said rail-like member to provide short transversely extending spaces between the ends of said rail member and of said downstream end portions of barely sufficient width to provide clearance for the width of said individual rolls while enabling said ring-like member to provide support for a substantial portion of the downstream end portion of said glass sheet intermediate the inturned downstream end portions of said ring-like member during said transfer, and means to support said rail member in said position, said rail member support means being constructed and arranged to provide clearance to enable said ring-like member to move past the positions occupied by said lifted doughnut rolls and to enable said rail member support means to move with said ring-like member past the position occupied by said shafts when said roll transfer section is lifted.

2. Apparatus as in claim 1, wherein said doughnut rolls mounted on said shafts are longitudinally aligned with said short, transversely extending spaces and the lower edge of said rail member and that of said rail member support means are so located that when said ring-like member moves upstream relative to said array of rolls and shafts before the latter is lowered from said lifted position, said rail member and said downstream end portions can move upstream in transversely spaced relation to the positions occupied by said array of rolls and shafts with said short spaces moving through said rolls and said rail member and said rail member support means move upstream in vertically spaced relation to said shafts.

3. Apparatus as in claim 1, wherein said rail member support means comprises a transverse rail extending across the width of said ring-like member within the outline of said ring-like member upstream of a vertical axis passing through the center of gravity of said glass sheet supported on said ring-like member and an elongated longitudinal rail interconnects said transverse rail and said rail member along a longitudinal line intermediate the positions occupied by said short, transversely extending spaces, said ring-like member being free of any transverse internal bracing means downstream of said transverse rail.

4. Apparatus as in claim 3, wherein said elongated longitudinal rail is supported in an oblique plane to one side of a longitudinal center line intersecting said vertical axis extending through the center of gravity of said glass sheet supported on said ring-like member, further including a second elongated longitudinal rail supported in an oblique plane to the other side of said longitudinal center line.

5. Apparatus as in claim 4, wherein said first and second elongated longitudinal rails are supported in mirror-image relation to said longitudinal center line.

6. Apparatus for transporting a glass sheet from a first glass sheet station to a second station for transfer to transfer rolls comprising an open ended ring-like member having a transversely extending space between its ends, a rail supported between the ends of said ring-like member to provide short spaces between each of its ends and the ends of said ring-like member, and a cantilever support connected to the closed-end portion of said ring-like member and having structural elements located entirely within the space that would be defined by said rail member and said outline member if the latter were continuous to support said rail member in a position it would occupy were it part of said ring-like member and the latter were continuous, the length of said rail member being slightly less than said transversely extending space to provide a pair of short spaces at either end thereof to enable said ring-like member and its attached rail member to pass through positions occupied by said transfer rolls when the latter are lifted.

* * * * *